United States Patent Office 3,108,568
Patented Oct. 29, 1963

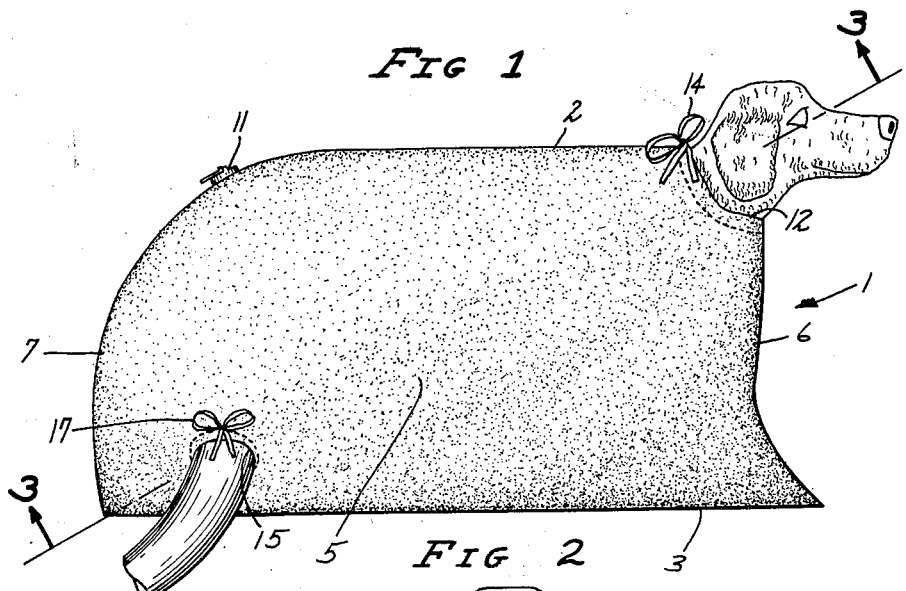
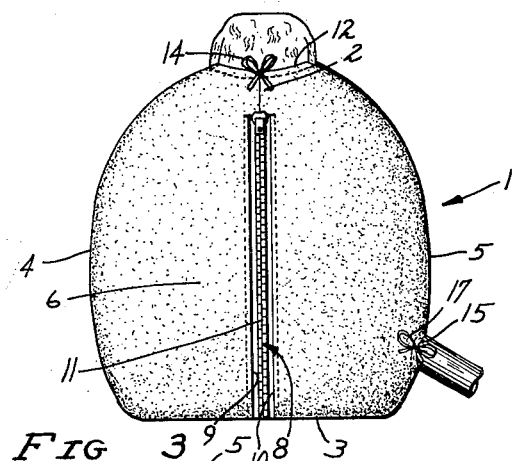
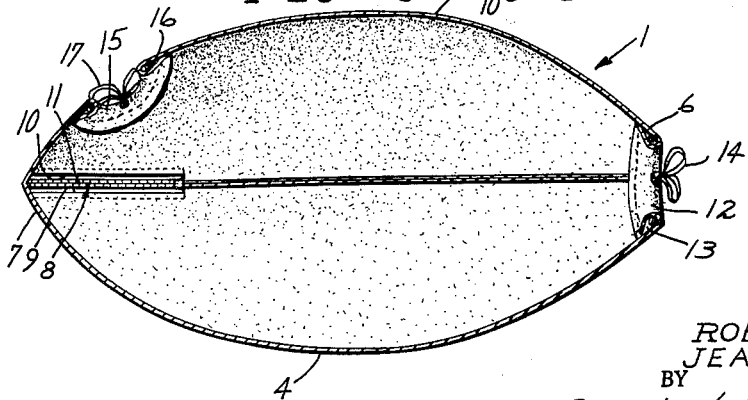
INVENTORS.
ROBERT E. WHITNEY
JEAN L. WHITNEY
BY
Merchant, Merchant & Gould
ATTORNEYS

3,108,568
DRYING BAG FOR PETS
Robert E. Whitney and Jean L. Whitney, both of 8218 Colfax Ave., Minneapolis, Minn.
Filed Aug. 22, 1962, Ser. No. 218,595
3 Claims. (Cl. 119—1)

This invention relates generally to equipment and accessories for pets, and more particularly it relates to a novel drying bag for pets.

It has been the desire of many people in recent years to keep household pets, such as dogs and cats, in their home. In keeping with this situation, and the necessity or desire to have a presentable and well-groomed animal, it is of course necessary to frequently bathe the animal. In order to prevent the obnoxious and objectionable presence in the home of a pet which has just been bathed and is therefore wet, the present invention has been designed, and an important object thereof is the provision of a drying bag which provides quick, efficient, convenient and economical means for drying the animal.

Another object of this invention is the provision of a drying bag for pets which is particularly adapted for use with any available source of forced air, such as in connection with the forced air hose of a hair dryer.

Another object of this invention is the provision of a drying bag for pets in which the animal may be quickly and efficiently dried, which does not require general confinement of the animal, and wherein there is no unnecessary and uncomfortable restraint of the animal.

Another object of this invention is the provision of a drying bag for pets which is designed and constructed with an adjustable head opening adapted to provide for the head and neck of a pet to extend therethrough.

A still further object of this invention is the provision of a drying bag for pets which is constructed so that the animal may be easily and quickly placed in and removed from the bag.

Other objects and advantages of this invention will become apparent from a consideration of the following detailed specification, appended claims and attached drawings.

Referring to the drawings, wherein like reference characters indicate like parts or elements throughout the several views:

FIG. 1 is a view in side elevation of this invention and showing the same with a pet therein;

FIG. 2 is an end view thereof; and

FIG. 3 is a view in section taken on the line 3—3 of FIG. 1, and with the animal removed therefrom.

Referring more specifically to the drawings, the drying bag is represented in its entirety by the reference numeral 1. The drying bag 1 comprises a top portion 2, a bottom portion 3, side portions 4, 5, a front end portion 6, and a rear end portion 7. For reasons which will become more apparent hereinafter, the drying bag 1 is preferably made from a slightly pervious flexible material, such as terrycloth material. An advantage provided by the use of a terry cloth material for making the drying bag 1 is that the same provides a readily available towel for rubbing the animal after the drying period is finished. The above notation of the use of a slightly pervious flexible material for making the drying bag 1 should not be recognized as excluding the use of a generally impervious material, such as a plastic material, the employment of which is considered to be within the scope of this invention.

As shown particularly in FIG. 2, the drying bag 1 is provided with a relatively large opening 8 adjacent the rear end portion 7 thereof. The rear opening 8 is formed by opposed edges 9, 10 of the drying bag 1 and is adapted to provide for the insertion and removal of a pet therethrough and into and out of the drying bag 1. The drying bag 1 further includes fastening means for the rear opening 8, which fastening means is disclosed in the form of a slide fastener or Zipper 11 mounted on the opposite edges 9, 10 of the drying bag 1 adjacent the rear opening 8 so as to provide means for opening and closing the opening 8 after the animal has been inserted or removed.

In accordance with this invention, the drying bag 1 further defines an adjustable head opening 12 located adjacent the front end portion 6 and adapted to provide for the head and neck of a pet to extend therethrough, as particularly shown in FIGS. 1 and 2. The material of the drying bag 1 adjacent the head opening 12 is doubled back and stitched so as to define a generally annular casing 13 adapted to receive a drawstring 14. The drawstring 14 provides securement means for the head opening 12 for securing the bag 1 around the pet's neck extending out of the head opening 12.

An important feature of this invention is that the drying bag 1 further comprises an adjustable air opening and coupling means adapted for connection to a forced air supply. More specifically, the drying bag 1 defines an adjustable air opening 15, and the bag 1 adjacent said opening 15 is again returned upon itself and stitched so as to define an annular casing 16 adapted to receive a drawstring 17, as shown particularly in the drawings. The drying bag 1 adjacent the air opening 15 is further adapted to be connected around or coupled to a forced air hose of a ladies hair dryer, or any other suitable source of forced air.

It should be apparent from the above, that efficient and convenient means has been disclosed for quickly and easily drying a pet after the same has been bathed. This invention has been thoroughly tested and found to be completely satisfactory for the accomplishment of the above noted objects; and while a preferred embodiment thereof in which the principles of the present invention have been incorporated has been shown and described above, it should be specifically understood that the same may be modified without departure from the scope and spirit of the appended claims.

What we claim is:
1. A drying bag adapted to fit around and generally enclose a pet,
   (a) said bag being formed of a slightly pervious flexible and absorbent material, said bag further comprising:
   (b) a top portion, a bottom portion, side portions and front and rear end portions,
   (c) an adjustable head opening defined adjacent the front end portion of the bag and adapted to provide for the head and neck of a pet to extend therethrough,
   (d) securement means provided for said head opening for securing the bag around the pet's neck extending out of said opening,
   (e) coupling means provided in said bag, and
   (f) said coupling means being adapted for connection to a forced air supply.
2. The combination of claim 1 in which said slightly pervious flexible and absorbent material comprises a terrycloth material.
3. A drying bag for pets adapted to fit around and generally enclose a pet,
   (a) said bag being formed of a slightly pervious flexible and absorbent terrycloth material, said bag further comprising:
   (b) a top portion, a bottom portion, side portions and front and rear end portions,
   (c) said bag having an opening adjacent the rear end portion thereof which opening is formed by opposed edges of the bag and which opening is adapted to provide for the insertion and removal of a pet therethrough and into and out of the bag, (d) a Zipper mounted on the opposite edges of the bag adjacent said opening for closing said opening, (e) an adjustable head opening defined adjacent the front end portion of the bag and adapted to provide for the head and neck of a pet to extend therethrough, (f) securement means provided for said head opening for securing the bag around the pet's neck extending out of said opening, (g) coupling means provided in said bag, and (h) said coupling means being adapted for connection to a forced air supply.

References Cited in the file of this patent

UNITED STATES PATENTS

| | | |
|---|---|---|
| 301,637 | Somerville et al. | July 8, 1884 |
| 2,536,943 | Kessel | Jan. 2, 1951 |
| 2,969,767 | Bassett | Jan. 31, 1961 |

FOREIGN PATENTS

| | | |
|---|---|---|
| 10,032 | Great Britain | 1900 |